UNITED STATES PATENT OFFICE.

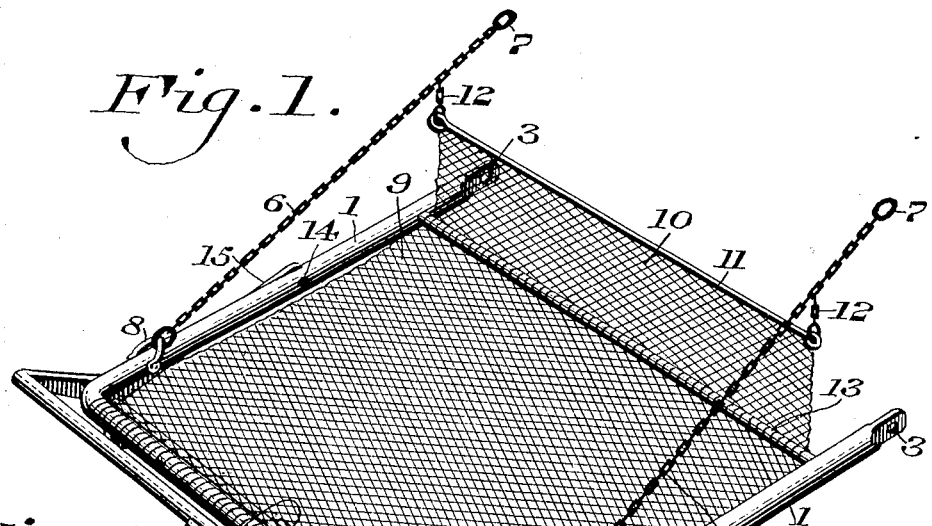
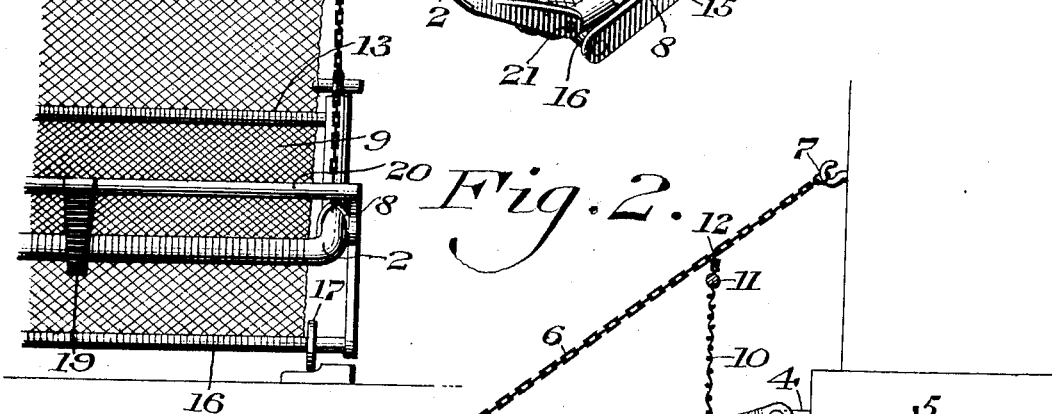
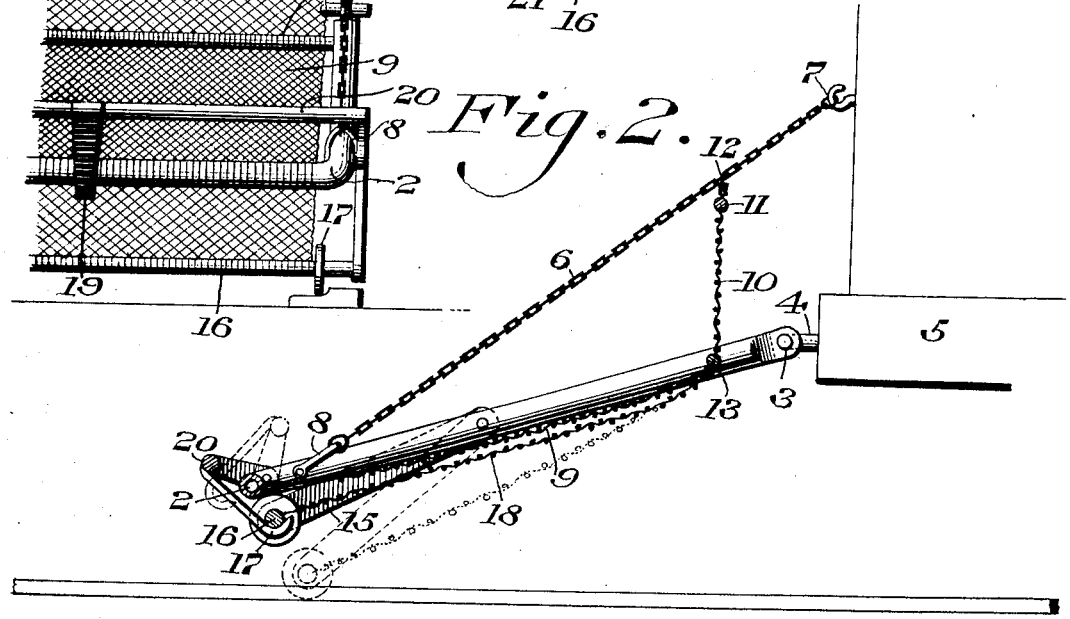

GRANT U. SHULTZ, OF READING, PENNSYLVANIA.

CAR-FENDER.

No. 888,358.　　　Specification of Letters Patent.　　　Patented May 19, 1908.

Application filed June 11, 1907. Serial No. 378,366.

*To all whom it may concern:*

Be it known that I, GRANT U. SHULTZ, a citizen of the United States, residing in the city of Reading, county of Berks, State of Pennsylvania, have invented a new and useful Car-Fender, of which the following is a specification.

In car fender operation, considerable difficulty is experienced in getting the fender low enough to surely protect persons from injury without having it too low for general operation of the cars. Many serious accidents are due to this difficulty and to the consequent avoidance of trouble in operation by lifting the trolley too high from the track. A further difficulty is experienced in protection against different kinds of accidents, a high fender being desirable for some reasons and a low fender for others.

The purpose of my invention is to adapt fenders in common use to the varying needs, obtaining a construction suitable for all purposes.

A further purpose of my invention is to provide a plurality of coöperating parts which shall be effective for fender purposes.

A further purpose of my invention is to provide an auxiliary fender and means for automatically putting it in effect.

A further purpose of my invention is to provide an auxiliary fender with a release therefor, which release shall be in advance of the fender.

Figure 1 represents my fender in perspective view and in one position. Fig. 2 represents a construction embodying my invention in side elevation with dotted lines showing possible positions of the parts. Fig. 3 represents in fragmentary front elevation, a construction embodying my invention with the auxiliary fender dropped to place.

Similar numerals of reference indicate corresponding parts in the figures.

Referring to the drawings. I make use of a general form of fender frame comprising side members 1 and cross-member 2 such as are commonly provided for fender work and preferably apply my invention thereto in order to make it possible to adapt my invention to fenders already in use with as few additional parts as possible and as little cost correspondingly as possible.

The side bars 1 are arranged ordinarily for pivoting at 3 to any suitable support 4 upon the body of the car 5. The outer end of the frame is preferably supported by chains 6 secured to the car in any suitable manner at 7 and attached to the sides of the frame at 8. A body net 9 and back net 10 complete the main construction, the back net being supported in any suitable manner as by a rod 11 suspended at 12 from the chains 6. I have shown the body net and back net as stretched and separated by a bar 13, but they may be otherwise draped, set or secured as desired. I have illustrated no side nets, but other nets than those so shown may be used.

At any suitable point 14 on each side of the frame, I preferably pivot a supplemental frame comprising in the form shown, side bars 15 and front bar 16. The front bar 16 is preferably provided with wheels 17 arranged to run on the ground or track when the supplemental frame is in the position shown in Fig. 3 and in dotted lines in Fig. 2.

In the preferred operation of my device, the supplemental frame carries a full support net 18 reaching from the bar 16 to the bar 13, but the length or character of this net may evidently be varied without departing from my invention. In normal operation, the supplemental frame is in raised position as seen in Fig. 1 and in full lines in Fig. 2 and is held in such raised position by a catch or latch 19 which is secured to a tripping bar 20, said tripping bar being pivoted at 21 in such a manner that the rocking of the tripping bar shall release the latch and thus permit the auxiliary fender to drop to place.

It will be noted that I place the tripping bar 20 well in advance of the auxiliary fender and preferably move the auxiliary fender downward and backward when throwing it into action, the result being that any object in front which strikes the tripping bar 20 will release the auxiliary fender which will drop to place. I purpose placing the auxiliary fender sufficiently behind the tripping bar 20 of the fender to drop to its position of use before it shall reach the object which tripped the latch, thus offering the advantages of the main or original fender and at the same time picking up and protecting any object or person which or who drops beneath the main fender.

It will be evident that the fender might drop directly without being pivoted and that other means of tripping the same might be provided.

Having thus described my invention, what I claim as new and desire to secure by Letters Patent, is:—

1. In a device of the character described, a main fender, an auxiliary fender pivoted thereto near the center of the main fender and having its front in the rear of the main fender, a latch for maintaining said auxiliary fender in raised position, and a trip for said latch arranged in advance of the main fender.

2. In a device of the character described, a pivoted main fender, an auxiliary fender pivoted to said main fender in advance of the latter's pivoted point, and a trip ahead of said main fender controlling the release of the auxiliary fender.

3. In a device of the character described, a pivoted main fender, an auxiliary fender pivoted thereto between the main fender's pivoted point and the front thereof and an upwardly movable trip in advance of the main fender controlling the release of the auxiliary fender.

4. In a device of the character described, a main fender, a pivoted auxiliary fender beneath said main fender, a latch controlling said auxiliary fender, and an upwardly movable trip in advance of the main fender for releasing said latch.

5. In a device of the character described, a pivoted main fender, an auxiliary fender lying beneath said main fender, and pivoted thereto between the latter's pivoted point and front thereof, a latch retaining said auxiliary fender normally in raised position, and a trip pivoted to said main fender, extending in front thereof, and arranged to move upwardly and inwardly thereon.

GRANT U. SHULTZ.

Witnesses:
SHERMAN H. HOVERTER,
ALOYESUS J. WEIKAMP.